Dec. 26, 1944. M. G. KUCH ET AL 2,366,115
CRANE ATTACHMENT FOR TRACTORS
Filed July 8, 1943 2 Sheets-Sheet 2
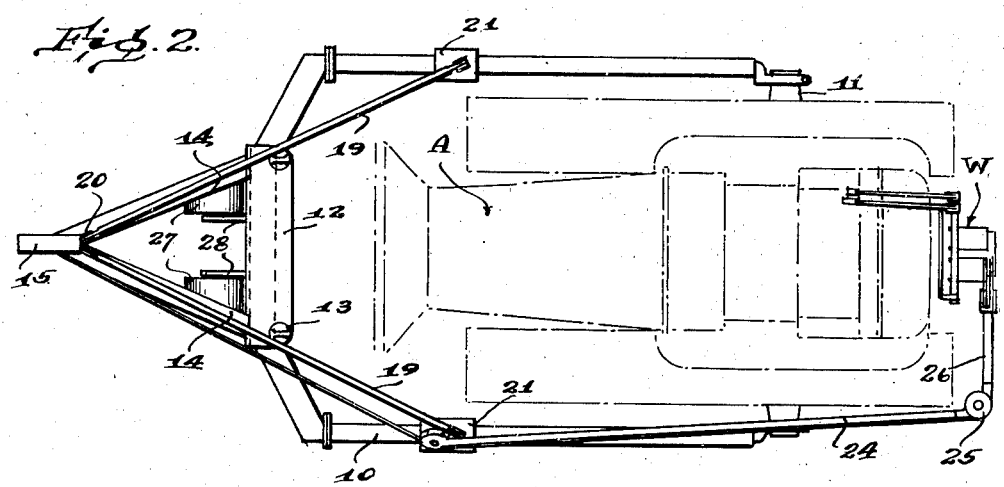
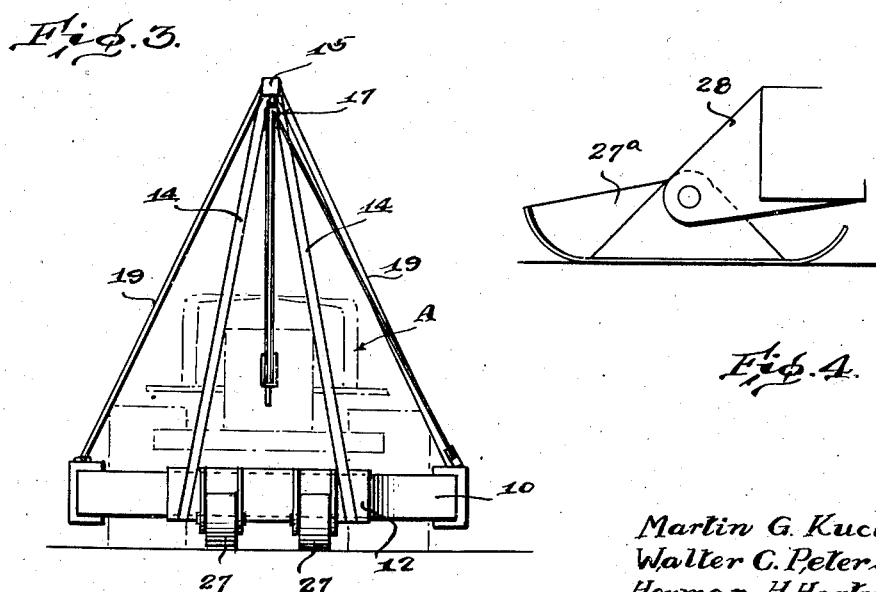
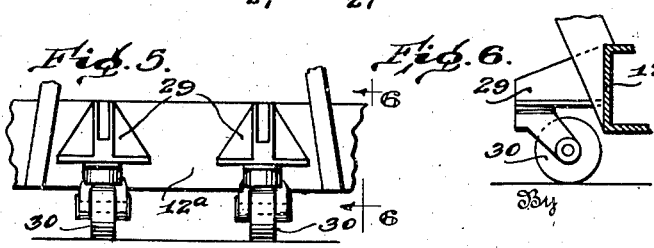
Martin G. Kuch
Walter C. Petersen
Herman H. Hartwig
Norman G. Livingston
Inventors
By
Attorney Patented Dec. 26, 1944

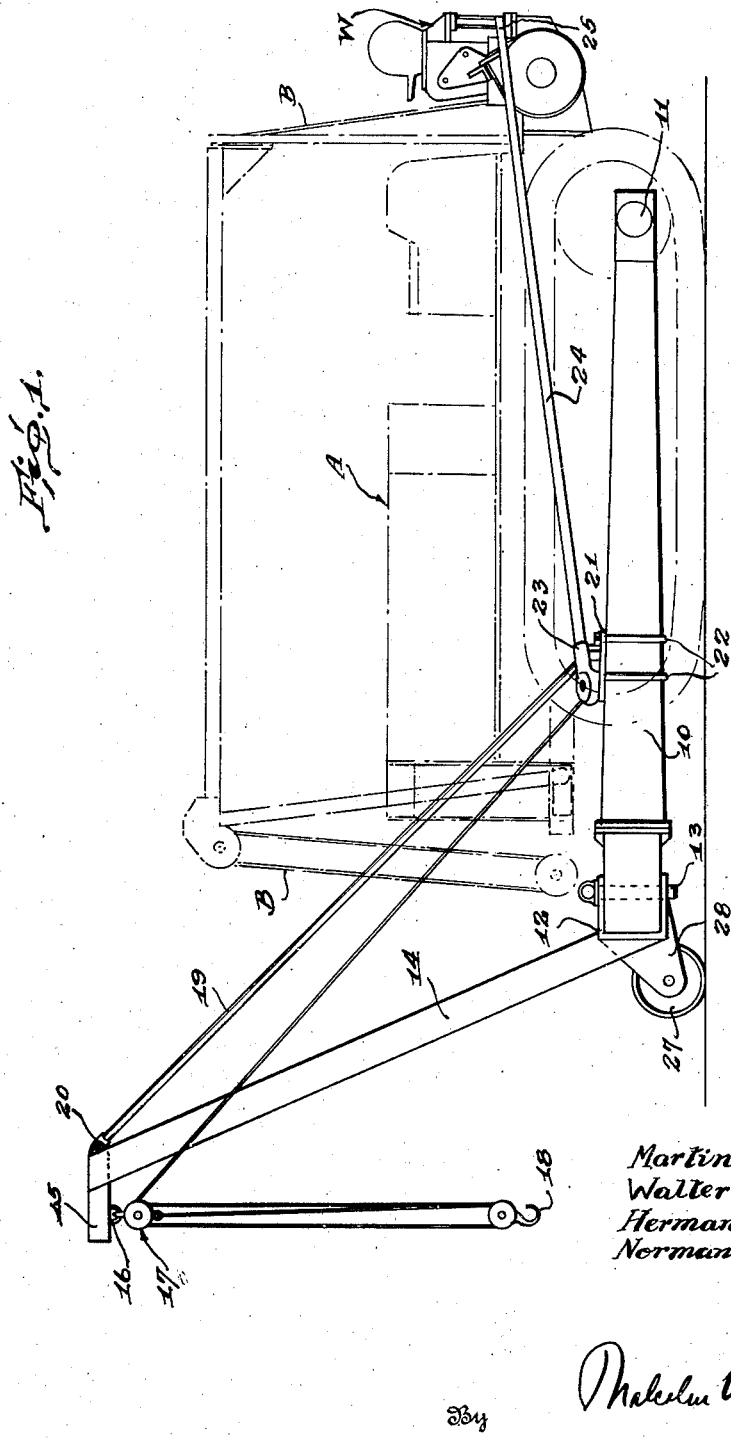

2,366,115

UNITED STATES PATENT OFFICE 2,366,115

CRANE ATTACHMENT FOR TRACTORS

Martin G. Kuch, Walter C. Petersen, Herman H. Hartwig, and Norman G. Livingston, Findlay, Ohio, assignors to The Buckeye Traction Ditcher Company, a corporation of Ohio Application July 8, 1943, Serial No. 493,920

8 Claims. (Cl. 212—142)

This invention relates to cranes but more particularly to a crane adapted to be used in connection with a tractor, but more particularly to tractors equipped with pusher frames, to the front ends of which is ordinarily secured the mold board or scraper blade, and an object is to produce a new and improved crane frame carried by the tractor after the mold board or scraper blade has been removed, thereby enabling the tractor to be converted within a comparatively short period of time and in a relatively simple manner, to a crane which can be moved along with the tractor to a position of use for elevating relatively heavy objects and moving them as desired.

Another object is to produce a new and improved attachment to the pusher frame of a tractor equipped with a power winch so constructed and designed that the crane can be readily mounted in position of use after the mold board or scraper blade has been moved and operatively connected to the tractor winch, the structure being such that the crane and associated parts can be moved by the tractor and the crane cable conveniently operated by the tractor mounted winch.

Other objects and advantages of the invention will hereinafter appear and for purposes of illustration but not of limitation, an embodiment of the invention is shown on the accompanying drawings in which Figure 1 is a side elevation of the crane attachment mounted on the tractor pusher frame in position of use and operatively connected to the tractor mounted winch;

Figure 2 is a top plan view of the structure shown in Figure 1;

Figure 3 is a front end elevation of the machine;

Figure 4 is a fragmentary side elevation showing a skid or runner which can be used in place of the roller structure shown in the foregoing figures;

Figure 5 is a fragmentary front end view of the mounting beam which is adapted to be secured to the horn or cross beam of the bulldozer push frame, the same being equipped with swivelly mounted rollers or casters; and Figure 6 is a sectional elevation on the line 6—6 of Figure 5.

The illustrated embodiment of the invention comprises a tractor A which, in this instance, is of the usual crawler mounted type and on which is mounted a pusher frame 10 which is generally U-shaped in form and as shown, the side arms are pivotally mounted on bosses or axles 11 at the rear end of the tractor so that the pusher frame can swing about the same on horizontally disposed axes. It will be understood that normally a mold board or scraper blade (not shown) is attached to the front end of the pusher frame so that the machine can operate either as a bulldozer or trailbuilder. However, when it is desired to employ the machine as a crane, the mold board or scraper blade is removed to enable the crane to be attached to the horn or cross member of the pusher frame 10.

As shown, the tractor A is equipped with a power winch W, which is carried at the rear end thereof and is operatively connected to be driven by the tractor as will be readily understood. As indicated, a cable arrangement B leads from the winch W over a top of the tractor A and to the horn of the pusher frame 10 so that the winch may be employed for raising or lowering the pusher frame as will be readily understood.

As shown, the crane attachment is applied to the front end of the horn of the pusher frame and comprises a U beam 12 which embraces the horizontal portion of the horn with a portion of the upper and lower flanges projecting rearwardly of the rear face of the horn particularly as shown in Figure 2. On opposite ends of the rearwardly extending flanges of the beam 12 are pairs of registering holes through which pins 13 extend for holding the beam in position. Rigid with the end portions of the beam 12 and inclining upwardly and inwardly toward each other, also in a direction outwardly away from the tractor, is an A frame composed of a pair of upright posts or beams 14. The upper ends of the upwardly inclined beams 14 are fixed, as by welding, to a forwardly projecting beam or support 15. Fixed to the under side of the support 15 is a supporting eye 16 to which a block and tackle 17 is attached, the lower sheave carrying a hook 18 to which the object is to be lifted is connected, as will readily be understood.

The A frame is braced by a pair of rods 19 which are pivoted at 20 at their upper ends to brackets on the rear end of the horizontal support 15. From the pivotal connections 20 the brace rods 19 extend downwardly divergingly to brackets 21 which rest on the upper sides of the side arms of the pusher frame 10 and are secured thereto by a pair of U bolts 22 which embrace the side arms respectively. Mounted on one of the brackets 21 is a sheave housing 23 and passing around the sheave contained therein is the tackle or cable from the block and tackle 17. Such cable leads through a tube 24 which is connected at one end to the sheave housing 23 and passes about a sheave disposed in a sheave housing 25. From the latter sheave, the cable extends through a tube 26 disposed at right angles to the tube 24 to the adjacent drum of the winch W.

The pusher frame 10 is held in spaced relation to the ground surface by a pair of rollers 27 which are carried by suitable bracket plates 28 fixed to and projecting forwardly of the front end of the horizontal beams 12. These rollers enable the machine to be moved from place to place when it is being used as a crane.

In some conditions, the rollers 27 may not be satisfactory, such for example, as in loose soil or sand. In such cases the rollers may be replaced by skids 27a such as illustrated in Figure 4. The skids or runners 27a are pivotally connected to the brackets 28 in the same manner as the rollers 27. As shown, the front and rear ends of the skids are upwardly curved thereby to facilitate the movement of the machine and maintain the pusher frame in the desired position above the ground surface.

In the alternate form shown on Figures 5 and 6, the U beam or mounting 12a carries a pair of laterally spaced brackets 29 which, as shown on Figure 6, project forwardly on the beam 12a. Suitably mounted on each of the brackets 29 is a swively mounted caster 30 which can swing about a vertical axis. This is particularly desirable because it enables the tractor to move laterally in one direction or the other; the casters 30 swivelling about their vertical axes and conforming to the direction of tractor movement. Obviously in the case of the rollers 27 above described, any sidewise movement of the tractor would slide the rollers because of their inability to swivel. That objection is clearly obviated in the swivel casters 30 which can automatically swing to one position or another in accordance with the direction of tractor movement. It will be understood that the mounting beam 12a is applied to the horn or cross member of the bulldozer pusher frame in the manner above described employing retaining pins such as the pins 13 above mentioned.

From the above description, it will be manifest that the crane may be readily and conveniently attached to or removed from the pusher frame so that it can serve satisfactorily as an accessory. In view of the extreme simplicity of the structure, the crane can be manufactured at relatively low cost and can be employed in various places where it is necessary to lift relatively heavy objects and move them from one place to another. In this manner the necessity of employing a separate machine especially adapted for crane use is obviated, and the usual bulldozer can be conveniently converted to that use as desired.

It is to be understood that numerous changes in details of construction, arrangement and operation may be effected without departing from the spirit of the invention especially as defined in the appended claims.

What we claim is:

1. In combination with a tractor having a pusher frame adapted to receive a mold board and mounted for pivotal movements about a horizontal axis and a winch driven from the tractor and operatively connected to said pusher frame for controlling the pivotal movement thereof, a demountable attachment for said pusher frame comprising a bracket fitting over said pusher frame in the region of and in substitution for the mold board, detachable fasteners for securing the bracket to said frame, an upwardly extending support rigid with said bracket, block and tackle carried by the upper end portion of said support, said tackle being connected to said winch for operating same.

2. The combination as claimed in claim 1, comprising a ground engaging support for said pusher frame forming a part of said support bracket.

3. In combination with a tractor having a pivotally mounted substantially U-shaped pusher frame adapted normally to mount a mold board at the front end thereof, a bracket detachably connected to the front end of said pusher frame in the region of and in substitution for the mold board, a vertically disposed support rising from said bracket, an arm projecting forwardly from the upper end portion of said support, ground engaging means forming a part of said bracket for spacing said pusher frame from the ground, and a block and tackle carried by said projecting arm.

4. In combination with a tractor, a pivotally mounted substantially U-shaped pusher frame adapted normally to mount a scraper blade or mold board, said pusher frame having longitudinal side arms and a horn or cross arm at the front end of the tractor, a U beam fitting over said horn with the flanges projecting inwardly therefrom, fasteners connecting said inwardly projecting portions, an A frame rising from said beam, block and tackle supported from the upper portion of said A frame, brackets connected to intermediate portions of said side arms, braces joining said last brackets respectively with the upper portion of said A frame, and ground engaging spacers on said U beam for spacing the pusher frame from the ground.

5. In combination with a tractor, a pivotally mounted substantially U-shaped pusher frame adapted normally to mount a scraper blade or mold board, said pusher frame having longitudinal side arms and a horn or cross arm at the front end of the tractor, a U beam fitting over said horn with the flanges projecting inwardly therefrom, fasteners connecting said inwardly projecting portions, an A frame rising from said beam, block and tackle supported from the upper portion of said A frame, brackets connected to intermediate portions of said side arms, braces joining said last brackets respectively with the upper portion of said A frame, said tractor having a winch, guide means on one of said last brackets for guiding the tackle to the winch, and ground engaging spacers on said U beam for spacing the pusher frame from the ground.

6. In combination with a tractor, a pivotally mounted substantially U-shaped pusher frame adapted normally to mount a scraper blade or mold board, said pusher frame having longitudinal side arms and a horn or cross arm at the front end of the tractor, a U beam fitting over said horn with the flanges projecting inwardly therefrom, fasteners connecting said inwardly projecting portions, an A frame rising from said beam, block and tackle supported from the upper portion of said A frame, brackets connected to intermediate portions of said side arms, braces joining said last brackets respectively with the upper portion of said A frame, and a ground engaging spacer on said U beam for spacing the pusher frame from the ground, said spacer being mounted for swivel movements about a vertical axis.

7. In combination with a tractor, a pivotally mounted substantially U-shaped pusher frame adapted normally to mount a scraper blade or mold board, said pusher frame having longitudinal side arms and a horn or cross arm at the front end of the tractor, a U beam fitting over said horn with the flanges projecting inwardly therefrom, fasteners connecting said inwardly projecting portions, an A frame rising from said beam, and block and tackle supported from the upper portion of said A frame.

8. In combination with a tractor, a pivotally mounted substantially U-shaped pusher frame adapted normally to mount a scraper blade or mold board, said pusher frame having longitudinal side arms and a horn or cross arm at the front end of the tractor, a U beam fitting over said horn with the flanges projecting inwardly therefrom, fasteners connecting said inwardly projecting portions, an A frame rising from said beam, block and tackle supported from the upper portion of said A frame, and ground engaging spacers in the form of rollers swivelly mounted on and forming a part of said U beam for spacing the pusher frame from the ground.

MARTIN G. KUCH.
WALTER C. PETERSEN.
HERMAN H. HARTWIG.
NORMAN G. LIVINGSTON.